United States Patent [19]

Shibata

[11] Patent Number: 5,306,523

[45] Date of Patent: Apr. 26, 1994

[54] METHOD OF APPLYING ORGANIC SOLVENT-BASED COATING SOLUTION

[75] Inventor: Norio Shibata, Kanagawa, Japan

[73] Assignee: Fuji Photo Film Co., Ltd., Kanagawa, Japan

[21] Appl. No.: 45,251

[22] Filed: Apr. 13, 1993

[30] Foreign Application Priority Data

Apr. 16, 1992 [JP] Japan .................................. 4-122614

[51] Int. Cl.⁵ .............................................. H01F 10/02
[52] U.S. Cl. .................... 427/129; 427/130; 427/131; 427/322; 427/356; 427/371; 427/412.1
[58] Field of Search ............... 427/129, 130, 131, 322, 427/356, 371, 412.1

[56] References Cited

U.S. PATENT DOCUMENTS 4,552,799 11/1985 Ryoke et al. .................. 428/194

FOREIGN PATENT DOCUMENTS 4030778 9/1990 Fed. Rep. of Germany.

Primary Examiner—Bernard Pianalto
Attorney, Agent, or Firm—Sughrue, Mion, Zinn, Macpeak & Seas

[57] ABSTRACT

A coating method and apparatus which enables high-speed coating with a minimum of defects such as streaks including cases where the surface tension of the coating solution is relatively high. The method includes the following steps: applying an excess amount of a cleaning fluid to the substrate; scraping off the cleaning fluid at a first scraping section; applying an excess amount of the coating solution to the substrate while a remaining portion of the cleaning fluid remaining on the substrate is in an undried state; and scraping off a surface-side portion of the coating solution at a second scraping section, thereby metering the amount of the coating solution to be applied. In addition, a similar object is attained by a coating method wherein, in the aforementioned coating method, the organic solvent has a viscosity of not more than 10 cp, and in a case where the surface tension of the cleaning fluid is $\sigma c$ (dyne/cm) and the surface tension of the coating solution is $\sigma l$ (dyne/cm), the surface tension of the cleaning fluid satisfies the relation $\sigma l - 7 \leq \sigma c \leq \sigma l$.

8 Claims, 2 Drawing Sheets

METHOD OF APPLYING ORGANIC SOLVENT-BASED COATING SOLUTION

BACKGROUND OF THE INVENTION

1. Field of the Invention

The present invention relates to a coating method, and more particularly to a method of applying an organic solvent-based coating solution in which the coating solution is applied at high speed to a traveling flexible substrate such as a plastic film so as to form a thin layer thereon. Examples of the coating solution include a low-viscosity coating solution such as an undercoating solution for a magnetic recording medium, a back-layer coating solution and a surface treatment solution.

2. Background

In the process of manufacturing a magnetic recording medium or the like, it is known to apply a low-viscosity coating solution such as an undercoating solution for a magnetic coating solution, a back-layer coating solution, and a surface treatment solution. These low-viscosity coating solutions are organic solvent-based coating solutions. Conventional methods of applying a thin layer of such a coating solution to a flexible substrate, such as a plastic film, include utilizing various rod coaters, wire bar coaters, blade coaters, extrusion coaters, and the like.

For example, a conventional method and apparatus for applying a coating solution having a viscosity of 10 cp or less is disclosed in Japanese Patent Application (Laid-Open) No. 156066/1982. In particular, this application discloses a metering and coating method using a wire bar coater in which a wire is wound around a rod member for smoothing an excessively applied coating solution. Additionally, Japanese Patent Application (Laid-Open) No. 60750/1987 discloses a rod coater-type dust-removing method for removing dust together with a solvent while the solvent and the like are adhered to a rotating rod member. Further, Japanese Patent Application (Laid-Open) No. 131364/1991, discloses utilizing a doctor blade of a substrate-pressurizing type for scraping off a foreign substance on the substrate or in the coating solution and for leaving a predetermined amount of coating solution on the substrate. In these coating methods and apparatuses, since dust removal can be accomplished effectively by initially forming a relatively large amount of coating solution on the substrate, not only is the substrate not likely to be scratched, but the number of steaks in the remaining coating solution is relatively low. Hence, the above described methods and apparatuses are adequate for forming a thin-layered coating on a substrate.

However, in a case where the aforementioned coating solution is applied as an undercoating solution in the process of manufacturing, for instance, a magnetic recording medium, the following problems are conventionally encountered. Since an excess amount of the coating solution is applied to a dry substrate in an open state, not only is it difficult to increase the coating speed, but if the excess amount is increased to enhance the foreign-substance removing performance, a problem can occur in regard to its metering capability, and the amount of required coating solution increases, resulting in higher manufacturing costs. Furthermore, particularly in a case where the surface tension of the coating solution is high, there has been a drawback in that the spreadability of the coating significantly declines, thereby making it difficult to effect high-speed coating. With the recent advent of high-speed coating where a magnetic coating solution is applied to a substrate to form a magnetic recording medium, it has become necessary to increase the coating speed of an undercoating solution or the like, which conventionally has not presented much of a problem.

In coating such a coating solution described above, as a method of increasing the coating performance (wettability) of the coating solution, a method of providing corona discharge treatment or the like on the surface of the substrate has hitherto been widely used. However, it has been determined that this type of surface treatment of the substrate, for which large equipment and huge equipment cost are required, has not produced adequate results.

Furthermore, in applying the coating solution, in a case where the application of a thin layer of 10 cc/m$^2$ or less is effected to reduce the running cost or increase the high-speed coating performance, it has been discovered that an unacceptable number of streaks are formed in the coating layer (i.e., the undercoating layer) due to foreign substances.

The present invention has been devised in view of the above-described problems, and its object is to provide a coating method which enables high-speed coating with a minimum of defects such as streaks even if the surface tension of the coating solution is high when an organic solvent-based coating solution of a low viscosity such as the one described above is applied to form a thin layer.

SUMMARY OF THE INVENTION

The aforementioned object of the present invention has been attained by a method of applying an organic solvent-based coating solution comprising the following steps: applying an excess amount of a cleaning fluid to the substrate; scraping off the cleaning fluid at a first scraping section; applying an excess amount of the coating solution to the substrate while a remaining portion of the cleaning fluid remaining on the substrate is in an undried state; and scraping off a surface-side portion of the coating solution at a second scraping section, thereby metering the amount of the coating solution to be applied. In addition, a similar object is attained by a coating method wherein, in the aforementioned coating method, the organic solvent has a viscosity of not more than 10 cp, and in a case where the surface tension of the cleaning fluid is $\sigma c$ (dyne/cm) and the surface tension of the coating solution is $\sigma l$ (dyne/cm), the surface tension of the cleaning fluid satisfies the relation $\sigma l - 7 \leq \sigma c \leq \sigma l$.

DETAILED DESCRIPTION OF PREFERRED EMBODIMENTS

Figure 1:
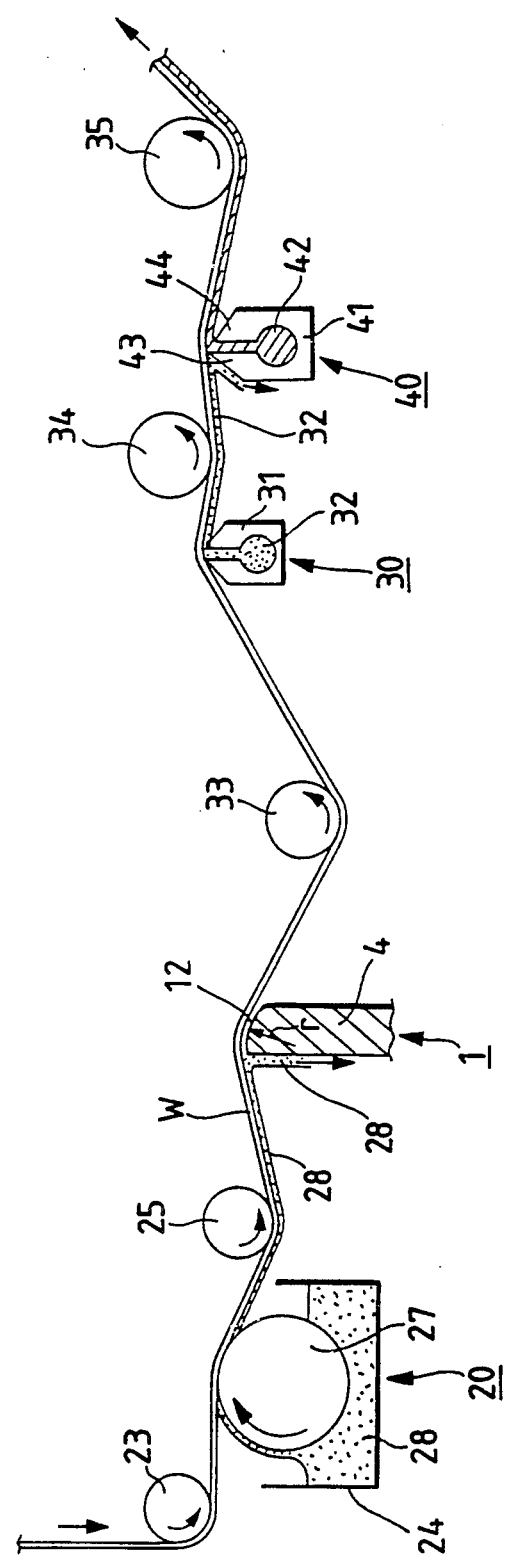
FIG. 1 is a schematic diagram of a coating facility in accordance with one embodiment to which the coating method of the present invention is applied.

Referring now to FIG. 1, a description will be provided of a method of applying an organic solvent-based coating solution in accordance with the present invention. In a preferred embodiment of the present invention, the method is concerned with a apparatus for manufacturing a magnetic recording medium, as illustrated in FIG. 1.

In the apparatus, a cleaning-fluid applying section 20 for applying a cleaning fluid 28, a first scraping section 1, an undercoating-solution applying section 30, and a second scraping section 40 are arranged in the stated order as viewed from the upstream side in the direction of travel (arrow A) of a substrate W.

The cleaning-fluid applying section 20 includes an open container 24 in which the cleaning fluid 28 is accommodated and a spreading roller 27 which is immersed in the cleaning fluid 28 and which abuts against a portion of substrate W disposed between transport rollers 23 and 25. Accordingly, as the spreading roller 27 rotates in synchronism with the substrate W, a predetermined amount of the cleaning fluid 28 is applied to the substrate.

The lower the viscosity of the precoated cleaning fluid, the smaller the gap between an upper-end surface of the rod 3 and the surface of the substrate so that the foreign-substance removing capability improves. Hence, it is preferred that the viscosity be relatively small.

In addition, the cleaning fluid 28 may have as its main constituent methyl isobutyl ketone, methyl ethyl ketone, butyl acetate, isobutyl acetate, toluene, xylene, cyclohexanone, or the like. A surface active agent or a substance having the capability of dissolving foreign substances may be added thereto, as necessary, so as to add chemical foreign-substance removing action to the physical releasing action, thereby promoting the cleaning effect.

It should be noted that the substrate W in the present invention includes the following: plastic films which generally have a width of several centimeters to several meters, a length of several dozens of meters, and a thickness of several microns to several hundreds of microns, such as polyethylene terephthalate, polyethylene-2,6-nathphalate, cellulose diacetate, cellulose triacetate, cellulose propionate, polyvinyl chloride, polyvinylidene chloride, polycarbonate, polyimide, polyamide, and the like; paper in which α-polyolefins having a carbon number of 2 to 20, such as polyethylene, polypropylene, and an ethylene-butane copolymer, are coated or laminated on paper; and a flexible strip-like material formed of aluminum, copper, zinc, or the like, or a strip-like material which uses that strip-like material as a base material and a preliminary processed layer is formed on its surface.

Various devices may be used to perform the scraping of the cleaning solution at the first scraping section 1. However, a blade is shown in the illustrated embodiment. As can be seen in FIG. 1, as the scraper scrapes off excess cleaning solution, foreign objects are also removed due to the pressure of the blade 4 against the substrate, which is not supported by a backup roller at the point at which the scraping occurs. It is noted that the blade does not directly contact the substrate due to the presence of the remaining, nonscraped cleaning solution. The scraped off cleaning fluid 28 can be recycled to the cleaning-fluid applying section 20 by circulating the scraped cleaning solution through an appropriate filter by means of an unillustrated fluid-supplying system.

The aforementioned blade 4 is arranged such that a blade surface 12 facing the substrate W is curved having a radius curvature $\gamma$ of, for instance, 2 mm to 30 mm. Then, the substrate W is made to lap the curved surface of the blade surface 12, as required, by adjusting, for example, the angle of approach of the substrate with respect to the blade. At the same time, by appropriately adjusting the tension of the substrate, the foreign substances can be scraped off, and the thin-film layer of the cleaning fluid 28 can be appropriately formed.

After the foreign substance adhering to the surface of the substrate W is thus removed, the thin-film layer of the cleaning fluid 28 is formed. Subsequently, before the thin-film layer becomes dry, the undercoating solution 32 is applied in excess by a coating head 31 between the transport rollers 33 and 34 recognizing that the undercoating solution 32 will be scraped off later. It should be noted that the undercoating solution 32 is supplied to a pocket of the coating head 31 by an unillustrated solution-supplying system.

The application of the undercoating solution 32 to the surface while the cleaning fluid 28 remains at least partially wet as described above, remarkably improves the wettability of the undercoating solution 32 onto the substrate, making it possible to remarkably improve the high-speed application of the undercoating solution 32. The wettability also improves when a surface active agent is contained in the cleaning fluid 28.

This undercoating solution is an organic solvent-based coating solution having a viscosity which is not more than 10 cp, preferably not more than 5 cp, and includes the organic solvent by 80% or more. Examples of this organic solvent include methyl isobutyl ketone, methyl ethyl ketone, butyl acetate, isobutyl acetate, toluene, xylene, cyclohexanone, and the like. As substances other than the organic solvent, the undercoating solution may include an anionic or cationic surface active agent or the like.

In a case where the aforementioned undercoating solution 32 with a viscosity of not more than 10 cp, particularly an undercoating solution of not more than 5 cp, is applied to the substrate W in accordance with the present invention, the wettability becomes dominant owing to the viscosity of the undercoating solution 32. As a result, the quality of the surface of the substrate W is substantially improved by the undried thin-film layer of the cleaning fluid 28, so that the high-speed thin-layer characteristic of the undercoating solution 32 is improved.

In addition, in accordance with a classical theory on wetting, it is generally considered that, in order for one organic liquid to be spread on another organic liquid, the surface tension of the liquid already applied is required to be lower than the surface tension of the liquid to be applied thereon. However, in accordance with a study conducted by the present inventors, this is not necessary. In particular, it was discovered that in a case where the surface tension of the cleaning fluid 28 was set to be $\sigma c$ (dyne/cm) and the surface tension $\sigma l$ (dyne/cm) of the undercoating solution 32 was within a range satisfying the relation $\sigma l - 7 \leq \sigma c \leq \sigma l$, it was possible to maintain the high-speed thin-layer characteristic of the undercoating solution 28 (coating solution) very effectively.

As described above, according to the invention, after the undercoating solution 32 is applied and before the undercoating solution 32 (layer) is dried, an excess portion is scraped off between the transport rollers 34 and 35 at the second scraping section 40. The scraping section 40 may include a coating head 41 for simultaneously scraping off the excess undercoating solution 32 and applying a magnetic coating solution 42, as shown. That is, the coating solution 41 scrapes off and meters the undercoating solution 32 by means of its front edge 43 (an upstream-side edge in the traveling direction of the substrate) to form a predetermined film thickness, and the magnetic coating solution 42 is applied through a slit formed by the front edge 43 and a back edge 44 (a downstream-side edge in the traveling direction of the substrate). It should be noted that the magnetic coating solution 42 is supplied to a pocket of the coating head 41 by an unillustrated solution-supplying system.

After the coating process is thus completed, the substrate is taken up after undergoing a drying process, a calendaring process, and the like.

Figure 2:
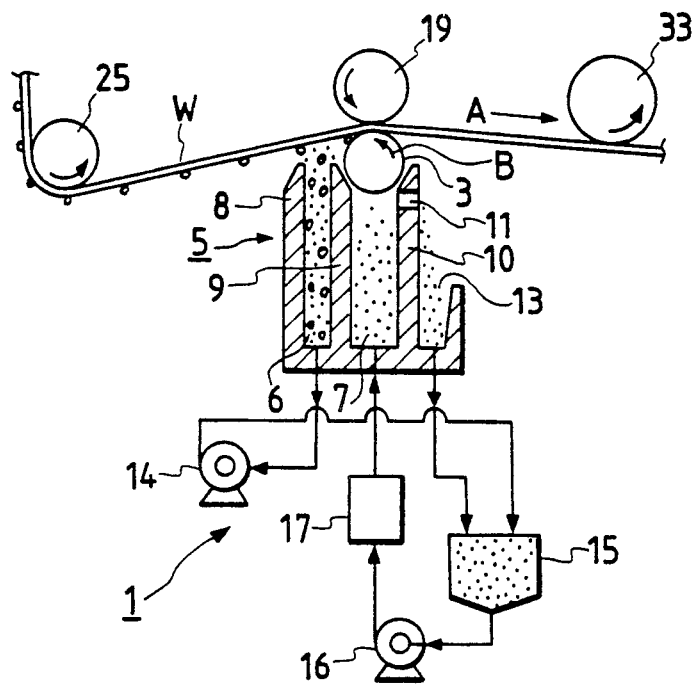
FIG. 2 is a schematic diagram of a device used for a first scraping section or a second scraping section in the present invention.

In the above-described embodiment according to the present invention, the blade-type device was used in the first scraping section 1, but the present invention may be modified as shown in FIG. 2. It should be noted that the device shown in FIG. 2 is disposed between the transport rollers 25 and 33 in FIG. 1, and in this case the cleaning-fluid applying section 20 may be omitted as will be described later.

In the first scraping section 1 shown in FIG. 2, the rod 3 is disposed such that it may be brought into contact with the surface of the substrate W subject to dust removal with a certain lapping angle. The rear surface of the substrate is supported by a backup roll 19 disposed between the transport rollers 25 and 33. The rod 3 is arranged to be rotated at an appropriate speed, e.g., at a speed of approximately 0.1 cm/sec., in an opposite direction B to a traveling direction A of the substrate W. It should be noted that any conventional means may be used to rotate the rod as long as the rod is capable of being rotated at a low-speed. A hydraulic or pneumatic motor is preferable in regard to environmental safety due to the concentration of the solvent gas.

The rod 3 should preferably have a diameter of 1 mm to 50 mm and the surface material thereof should be made of a cemented carbide (e.g. WC-TAC) or a hard material (fine ceramics such as, for example alumina A-150 or zirconia) and finished to a surface roughness of 1.0 μm to 0.05 μm in terms of Rmax. Furthermore, the surface length of the rod 3 is naturally set to be greater than the overall width of the substrate W.

In addition, the rod 3 is held rotatably by a block 5 having a width substantially equivalent to the surface length of the rod 3. In the block 5, slits 6 and 7, which divide its interior in half, are defined by partition walls 8, 9 and 10.

The upper end faces of the partition walls 9 and 10 are formed into curved surfaces with a radius substantially equivalent to that of the rod so as to retain the rod 3 in the appropriate position. The downstream-side partition wall 10 is provided with a plurality of liquid outlets 11 arranged at appropriate intervals in the widthwise direction at a position lower than the curved upward end face thereof. A reservoir 13 formed by an outer wall is provided on the outer side of the partition wall 10.

Meanwhile, the slits 6 and 7 communicate with a solvent-supplying system comprising a supply tank 15 for supplying the same fluid as the cleaning fluid 28, a pressurizing pump 16, and a filter 17. The interiors of the slits 6 and 7 are filled with the solvent, and a major portion of the solvent is discharged to the aforementioned reservoir 13 through an upper portion of the slit 6 and the liquid outlets 11, and is collected by the solvent-supplying tank 15, as required.

In the device arranged as described above, if the substrate 1 is conveyed in the direction of arrow A, deposits 18 on the surface of the substrate 1, upon being brought into close proximity with the surface of the rod 3 rotating in the opposite direction B to that of the substrate 1, are separated from the surface of the substrate 1 by means of the rotation of the rod 3 and the action of the solvent applied to the substrate through the slit 6. The deposits 18 are then transferred onto the surface of the rod 3 and are transferred to the upper end of the slit 6 as the rod 3 further rotates.

Thus, the foreign substance adhering to the substrate surface are caused to float by means of the cleaning fluid 28 applied by the cleaning-fluid applying section 20. The rod 3 whose surface is wetted by the cleaning fluid is capable of removing the deposits (foreign substance) effectively without damaging the substrate surface by means of the action of entraining the deposits onto the wetted surface thereof as the rod 3 continues to rotate.

Meanwhile, the deposits 18 transferred onto the surface of the rod 3 are separated from the surface of the rod 3 by means of the cleaning action of the solvent supplied to the slits 6 and 7 while the deposits 18 are passing through the ends of the slits 6 and 7. The deposits are then discharged to the outside through a lower portion of the slit 6 and the liquid outlets 11. The cleaning fluid containing the foreign substance can be returned to the supply tank 15 via a pump 14 or the like, as shown in FIG. 2, or can be supplied to the container 14 after the foreign substance is removed by an appropriate filter.

In the above described embodiment, the coating head 41 is used in the second scraping section 40. However, it is understood that such a coating head is not required in the second scraping section. That is, the second scraping section 40 could be provided with any appropriate means for scraping off a portion of the undercoating solution 32 so as to meter the amount remaining such as, for example a simple blade-like scraping device. In this case, the magnetic coating solution 42 is subsequently applied in a state in which the undercoating solution 32 is in an undried state or in a dried state.

Figure 3:
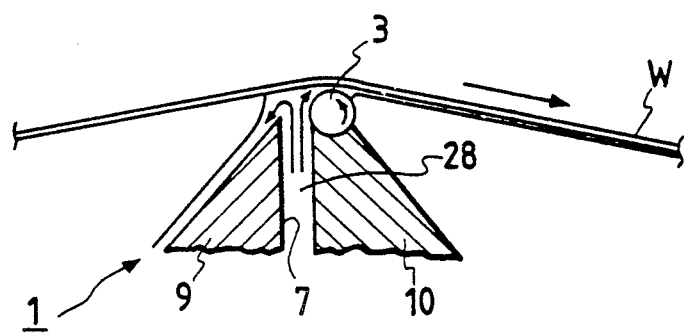
FIG. 3 is a schematic diagram of another device used for a first scraping section or a second scraping section in the present invention.

In addition, the form of the first scraping section 1 in the present invention is not restricted to the embodiments shown in FIGS. 1 and 2, and it is possible to use a device such as the one shown in FIG. 3. Referring to FIG. 3, as in the FIG. 1 embodiment, a backup roll in not utilized and scraping is effected in accordance with a basic principle which is similar to that of FIG. 1. In this case, a situation is shown in which, for instance, the coating solution, which is supplied through the slit 7, is substantially removed by the rod 3 rotating in the opposite direction to the direction of travel of the substrate W, and the fluid scraped off after being metered and applied to a thin-layer-coated state flows out along a slanting surface of the upstream-side partition wall 9. It should be noted that the rod 3 is appropriately supported by the top of the downstream-side partition wall 10 and is rotatable.

In addition, in the present invention, the first scraping sections shown in FIGS. 1 through 3 can, of course, be used as the second scraping section.

As mentioned above, the organic solvent-based coating solution of the present invention may comprise various coating solutions including the undercoating solution used during the manufacture of a magnetic recording medium, the back-layer coating solution to be applied to the substrate's path surface, and the surface treatment solution.

As the apparatus capable of implementing the present invention, various devices can be used as described above. However, in addition to those illustrated in the foregoing embodiments, it is possible to use the apparatus disclosed in Japanese Patent Application (Laid-Open) No. 156066/1982, the apparatus disclosed in Japanese Patent Application Laid-Open No. 150571/1984, or the like, as discussed above. The device for applying a cleaning fluid is not restricted to the device shown in FIG. 1, but conventionally known devices of various types may be used.

As described above, in accordance with the present invention, since when an organic solvent-based coating solution is applied to a flexible substrate, an excess amount of a cleaning fluid is applied to the substrate, the cleaning fluid is scrapped off by the first scraping section, and the coating solution is applied while the remaining portion of the cleaning fluid remaining on the substrate is in an undried state, i.e., since the surface to be coated with the coating solution is wet due to the cleaning fluid, the wettability of the substrate is remarkably improved and the high-speed coating characteristic of the coating solution is also remarkably improved. At the same time, it is possible to make the coating thickness uniform and reduce the defects such as coating streaks due to the improvement of the coating characteristic. Therefore, when a surface-side portion of the coating solution is subsequently scraped off in the second scraping section, the metering and application of the coating solution become stable and can be effected accurately. Hence, when a magnetic coating solution, for example, is further applied to the coating solution, it is possible to contribute to the stabilization of application of that magnetic coating solution. Examples Hereafter, the effects of the present invention can be understood by considering the following examples.

EXAMPLE 1

In the first example, the rod bar coater illustrated in FIG. 3 was used in both the cleaning-fluid applying section and the first scraping section. The rod had a diameter 1.0 mm and the rotational speed of the rod was 50 rpm in the opposite direction to the traveling direction of the substrate. In addition, the rod bar coater illustrated in FIG. 3 was also used to apply the undercoating solution and to scrape a portion of the undercoating solution thus applied. Thus, the rod bar coater was used to perform the steps of the undercoating applying section and the second scraping section. The diameter of the rod bar 3 was 4.0 mm, while the rotational speed was 50 rpm in the opposite direction to the traveling direction of the substrate. Additional parameters were as follows:

Substrate:
material: polyethylene terephthalate film
thickness: 10 μm
width: 300 mm
tension: 5 kgw/300 mm Cleaning fluid: a mixed fluid of cyclohexanone and methyl ethyl ketone. The surface tension was adjusted by a ratio between the two components. It should be noted that, as the numerical values of the surface tension, those listed in *Solvent Handbook* (compiled by Shohzo Asahara et al., Kodansha Publishing Co., 1976 Edition) were used, and as the value of the mixed solution, the values of the two solvents were averaged on the basis of their volumes. The viscosity was 0.4 to 2.2 cp depending on the constituent ratio.

Coating solution: 4 wt. % of polyester (Stafix made by Fuji Photo Film Co., Ltd.) was dissolved in the mixed solvent of cyclohaxanone and methyl ethyl ketone. The adjustment of surface tension and the handling of numerical values were similar to the cleaning fluid. It should be noted that when the viscosity of the above coating solution was applied after being adjusted, it was not possible to effect a coating with a viscosity of 10 cp or more. In addition, the coating thickness was set to 10 cc/m$^2$. The measurement ranges of the surface tension of the cleaning fluid and the surface tension of the coating solution were both set in the range of 24 to 34 (dyne/cm). The results are shown in Table 2 below.

In addition, to ascertain the effect of the above example, the upper-limit speed of application of the above coating solution with the coated surface of the substrate in a dry state was measured by way of a comparative example. The viscosity of the coating solution at this time was 5 cp, and the surface tension was measured in the range of 24 to 34 (dyne/cm). The results are shown in Table 1.

TABLE 1

| Upper-Limit Speed of Coating the Substrate in a Dried State | | | | | | |
|---|---|---|---|---|---|---|
| σ1 (Dyne/cm) | 24 | 26 | 28 | 30 | 32 | 34 |
| Upper limit speed | 850 | 800 | 750 | 490 | 290 | 180 |

TABLE 2

| Upper-Limit Speed of Coating (m/min) in Example 1 | | | | | | | | | | | | |
|---|---|---|---|---|---|---|---|---|---|---|---|---|
| | | σc (dyne/cm) | | | | | | | | | | |
| | | 24 | 25 | 26 | 27 | 28 | 29 | 30 | 31 | 32 | 33 | 34 |
| σ1 | 24 | 900 | 850 | 820 | 800 | 750 | 600 | 490 | 380 | 290 | 230 | 180 |
| dyne/ | 26 | 850 | 820 | 800 | 800 | 750 | 600 | 490 | 380 | 290 | 230 | 180 |
| cm | 28 | 820 | 800 | 800 | 800 | 750 | 600 | 490 | 380 | 290 | 230 | 180 |
| | 30 | 510 | 560 | 660 | 710 | 660 | 570 | 470 | 380 | 290 | 230 | 180 |
| | 32 | 250 | 290 | 350 | 420 | 510 | 500 | 440 | 360 | 290 | 230 | 180 |
| | 34 | 150 | 150 | 160 | 180 | 310 | 420 | 350 | 290 | 240 | 200 | 180 |
| | | B1 | | | | | | B2 | | | | |

Here, the effect of the upper-limit speed of application in Table 2 was examined by using the upper-limit speed of application in Table 1 as a reference. As a result, it was possible to ascertain an improvement in the applicable upper-limit speed in a region sandwiched between a borderline B1 and a borderline B2 in Table 2. If this result is expressed by a formula of surface tension, it can be seen that an application speed which is higher than the case of Table 1 is possible under the condition of $\sigma1 - 7 \leq \sigma c \leq \sigma1$.

EXAMPLE 2

The material of the substrate was polyethylene naphthalate, and the other conditions were the same as in Example 1 and a similar experiment was conducted. The applicable upper-limit coating speed with respect to the surface tension of the cleaning fluid and the coating solution under these conditions is shown in Table 3.

TABLE 3

Upper-Limit Speed of Coating (m/min) in Example 2

|  |  | σc (dyne/cm) | | | | | | | | | | |
|---|---|---|---|---|---|---|---|---|---|---|---|
|  |  | 24 | 25 | 26 | 27 | 28 | 29 | 30 | 31 | 32 | 33 | 34 |
| σl | 24 | 900 | 800 | 800 | 790 | 750 | 590 | 480 | 380 | 290 | 220 | 180 |
| dyne/ | 26 | 850 | 820 | 800 | 790 | 750 | 590 | 480 | 380 | 290 | 220 | 180 |
| cm | 28 | 800 | 800 | 800 | 790 | 750 | 590 | 480 | 380 | 290 | 220 | 180 |
|  | 30 | 510 | 560 | 660 | 710 | 660 | 570 | 460 | 380 | 290 | 220 | 180 |
|  | 32 | 250 | 290 | 350 | 420 | 510 | 500 | 440 | 360 | 290 | 220 | 180 |
|  | 34 | 150 | 150 | 160 | 180 | 310 | 420 | 350 | 290 | 240 | 200 | 180 |
|  |  | B1 | | | | | | B2 | | | | |

Here again, an improvement of the upper-limit speed of application in Table 3 was examined by using the upper-limit speed of application in Table 1 as a reference. As a result, it was possible to ascertain an improvement in the applicable upper-limit speed in a region sandwiched between the borderline B1 and the borderline B2 in Table 3. If this result is expressed by a formula of surface tension, it can be seen that, in the same way as in Example 1, a higher application speed that which was achieved in the case of Table 1 is possible under the condition of $\sigma 1 - 7 \leq \sigma c \leq \sigma 1$.

EXAMPLE 3

A mixed solution of cyclohexanone and ethanol was used as the cleaning fluid, in which case the viscosity was 1.1 to 2.2 cp. The other conditions were the same as in Example 1 and a similar experiment was conducted. The applicable upper-limit coating speed with respect to the surface tension of the cleaning fluid and the coating solution under these conditions is shown in Table 4.

TABLE 4

Upper-Limit Speed of Coating (m/min) in Example 3

|  |  | σc (dyne/cm) | | | | | | | | | | |
|---|---|---|---|---|---|---|---|---|---|---|---|
|  |  | 24 | 25 | 26 | 27 | 28 | 29 | 30 | 31 | 32 | 33 | 34 |
| σl | 24 | 900 | 850 | 830 | 820 | 760 | 600 | 490 | 370 | 290 | 230 | 170 |
| dyne/ | 26 | 860 | 840 | 810 | 800 | 760 | 600 | 490 | 370 | 290 | 230 | 170 |
| cm | 28 | 830 | 820 | 810 | 800 | 760 | 600 | 490 | 370 | 290 | 230 | 170 |
|  | 30 | 500 | 560 | 660 | 710 | 660 | 570 | 470 | 370 | 290 | 230 | 170 |
|  | 32 | 260 | 290 | 350 | 420 | 510 | 500 | 440 | 350 | 290 | 230 | 170 |
|  | 34 | 140 | 140 | 150 | 170 | 310 | 430 | 360 | 290 | 240 | 190 | 170 |
|  |  | B1 | | | | | | B2 | | | | |

Here again, an improvement of the upper-limit speed of application in Table 4 was examined by using the upper-limit speed of application in Table 1 as a reference. As a result, it was possible to ascertain an improvement in the applicable upper-limit speed in a region sandwiched between the borderline B1 and the borderline B2 in Table 4. If this result is expressed by a formula of surface tension, it can be seen that, in the same way as in Example 1, a higher application speed than in the case of Table 1 is possible under the condition of $\sigma 1 - 7 \leq \sigma c \leq \sigma 1$.

I claim:

1. A method of applying an organic solvent-based coating solution comprising the following steps:
   (a) applying an excess amount of a cleaning fluid to a moving substrate;
   (b) scraping off a portion of the cleaning fluid utilizing a first scraping means, a remaining portion of the cleaning fluid remaining on said substrate;
   (c) applying an excess amount of the coating solution to the substrate while said remaining portion of the cleaning fluid is in an undried state; and
   (d) scraping off a portion of the coating solution utilizing a second scraping means so as to meter the amount of coating solution remaining on said substrate.

2. The method of claim 1, wherein the coating solution has a viscosity of not more than 10 cp.

3. The method of claim 2, wherein the relationship between the surface tension of the cleaning fluid expressed as σc (dyne/cm) and the surface tension of the coating solution expressed as σl (dyne/cm), is defined by $\sigma 1 - 7 \leq \sigma c \leq \sigma 1$.

4. The method of claim 1, wherein steps (a) and (b) are performed substantially simultaneously.

5. A method of forming a magnetic recording medium, comprising the following steps:
   (a) applying an excess amount of a cleaning fluid to a moving substrate;
   (b) scraping off a portion of the cleaning fluid utilizing a first scraping means, a remaining portion of the cleaning fluid remaining on said substrate;
   (c) applying an excess amount Of an undercoating solution to the substrate while said remaining portion of the cleaning fluid is in an undried state;
   (d) scraping off a portion of the undercoating coating solution utilizing a second scraping means so as to meter the amount of undercoating solution remaining on said substrate; and
   (e) applying a magnetic coating solution to the substrate.

6. The method of claim 5, wherein the undercoating solution has a viscosity of not more than 10 cp.

7. The method of claim 6, wherein the relationship between the surface tension of the cleaning fluid expressed as σc (dyne/cm) and the surface tension of the undercoating solution expressed as σl (dyne/cm), is defined by $\sigma 1 - 7 \leq \sigma c \leq \sigma 1$.

8. The method of claim 5, wherein steps (c) and (d) are performed substantially simultaneously.

* * * * *